United States Patent
Bochan

[11] 3,864,986
[45] Feb. 11, 1975

[54] AUTOMATIC BELT TIGHTENER
[75] Inventor: John Bochan, Louisville, Ky.
[73] Assignee: General Electric Company, Louisville, Ky.
[22] Filed: Nov. 19, 1973
[21] Appl. No.: 416,730

[52] U.S. Cl. ...... 74/226, 74/242.11 C, 74/242.11 R, 74/242.15 R
[51] Int. Cl. ........ F16h 7/00, F16h 7/12, F16h 7/10
[58] Field of Search .... 74/226, 242.11 C, 242.11 R, 74/242.15 R

[56] References Cited
UNITED STATES PATENTS
| | | | |
|---|---|---|---|
| 959,667 | 5/1910 | White | 74/242.11 R |
| 2,099,218 | 11/1937 | Nicholson et al. | 74/242.11 C |

FOREIGN PATENTS OR APPLICATIONS
| | | | |
|---|---|---|---|
| 52,313 | 6/1910 | Germany | 74/226 |

Primary Examiner—Leonard H. Gerin

[57] ABSTRACT

An automatic belt tightener for use in a belt drive mechanism for transmitting torque between a driving rotatable member and a driven rotatable member through a flat drive belt. Included is a roller assembly having a pair of rollers with their longitudinal axes of rotation parallel and arranged a fixed maximum distance apart and in a wedge-like relationship with the drive shaft of a drive motor. The drive belt passes around the rollers and the shaft in such a way that as torque is applied, the rollers will exert radial forces against the belt normal to the shaft to wedge the belt into driving engagement with the shaft. The roller assembly is free to pivot about the shaft such that any slack in the belt will be taken up by the belt passing further around one of the rollers as the roller assembly pivots thereby effecting proper belt tensioning.

9 Claims, 4 Drawing Figures

PATENTED FEB 1 1 1975  3,864,986
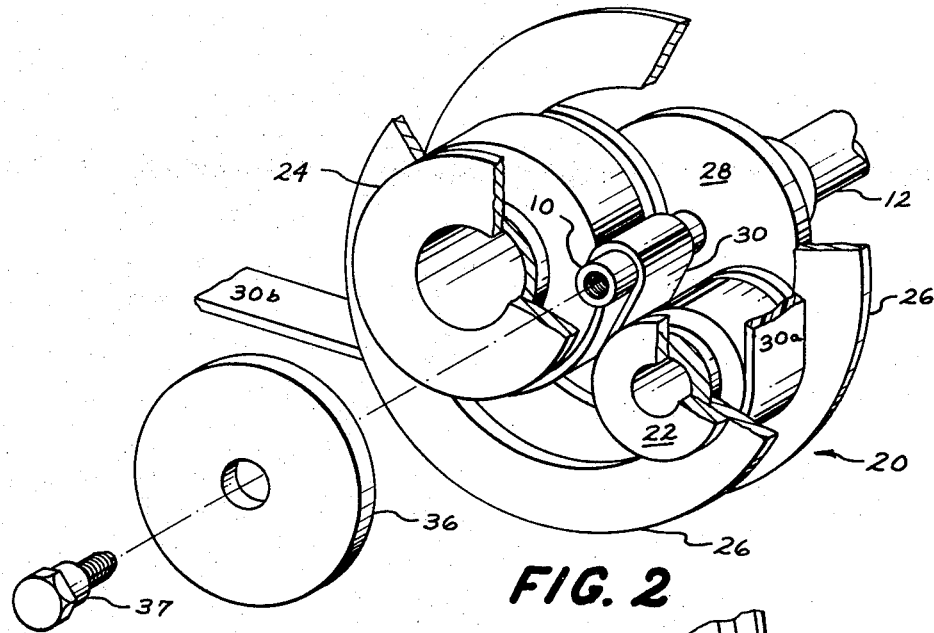
FIG. 2
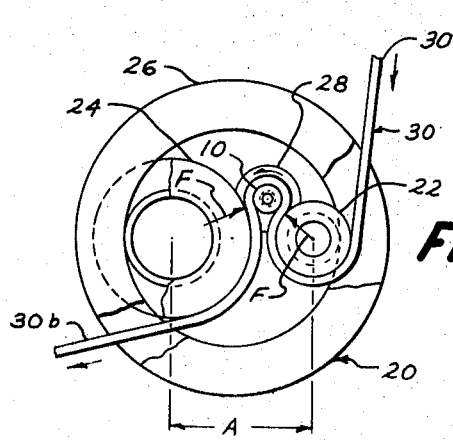
FIG. 1
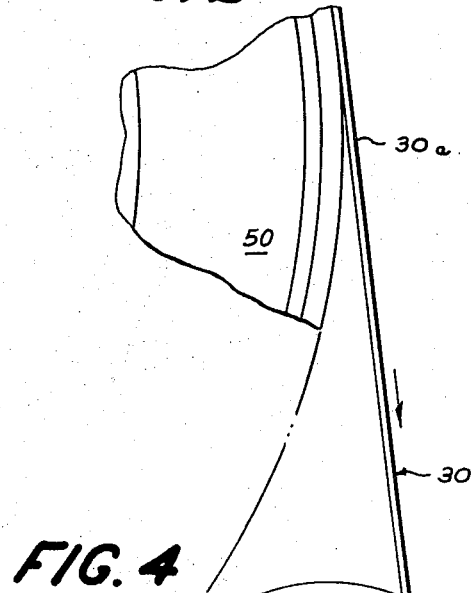
FIG. 4
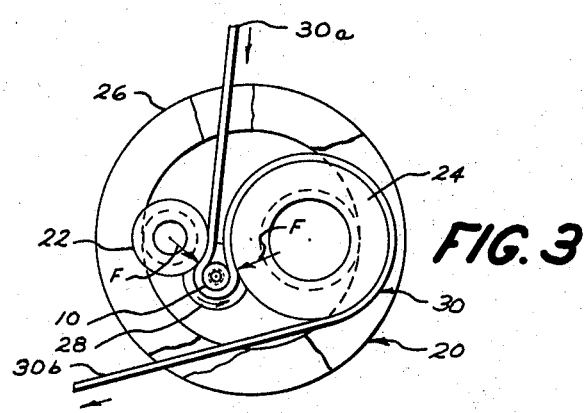
FIG. 3
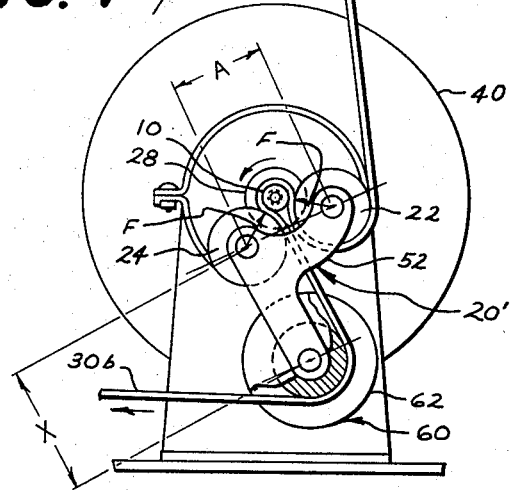

AUTOMATIC BELT TIGHTENER

BACKGROUND OF THE INVENTION

1. Field of the Invention

The present invention relates to an automatic belt tightener and more particularly to a belt drive mechanism for transmitting torque between a driver and a rotatable member to be driven thereby making use of such an automatic belt tightener for insuring efficient transfer of torque between the driver and the driven member and further, for automatically taking up any slack that may be present in such a belt drive arrangement.

2. Description of the Prior Art

The rotational velocity of an element being rotated, such as the drum of a domestic clothes dryer, is often times critical and is necessary to be kept within given small tolerances in order to maintain the proper tumbling of clothes in the drum. This is especially so since the outside diameter or surface of the dryer tumbling drum is commonly used as a large pulley. However, in converting from the use of a four-pole drive motor rotating at 1,725 RPM's to a two-pole drive motor rotating at 3,450 RPM's, in order to maintain this fixed rotational velocity it is necessary to halve the diameter of the motor driven shaft; that is, when the drive shaft of the four-pole motor was 5/8 inch diameter, it is necessary to convert to a 5/16 inch diameter when using a two-pole motor. A problem arises, that of poor driving engagement between the motor shaft or quill and the drive belt due to reduced frictional surface. In fact, a two-pole motor having a 5/16 inch diameter shaft turning at 3,450 RPM's is virtually unable to transmit full torque without external help and instead causes overheating and subsequent destruction of the belt.

Prior art such as U.S. Pat. No. 2,243,538 Salfisberg shows a device for providing pressure between a belt and a driving pulley independent of tension in the belt and independent of any take-up device that is ordinarily used to regulate that tension. Salfisberg U.S. Pat. No. 2,243,538 shows a set of three pulleys, the pressure exerted against the belt being manually adjustable by varying air pressure in a pneumatic drive pulley. It is, however, desirable that such frictional engagement between the belt and the driving member be applied automatically by the device itself.

Furthermore, in production application, a tolerance is necessary in belt lengths; and means, preferably automatic, must be provided for taking up the slack that may result in a belt drive system due to this tolerance. Also, with use and age, the belt tends to lengthen and it is desirable that means should be provided for automatically taking up the slack that results.

The prior art has taught the use of idle roller tensioners which are usually spring loaded to effect this operation. One such application is shown in U.S. Pat. No. 3,211,015 - Bochan, assigned to the same assignee as the present invention. There is, however, no suitable, low-cost way of combining the functions of taking up the belt slack and increasing the frictional drive engagement automatically thereby eliminating the idler roller tensioners.

By the present invention, there is provided an automatic belt tightener that solves the above-mentioned problems and which is highly reliable, efficient and of low-cost.

SUMMARY OF THE INVENTION

In accordance with the present invention, there is provided in a belt drive mechanism for transmitting torque between a driving rotatable member and a driven rotatable member through a drive belt, an automatic belt tightener. Included is a freely riding, roller assembly that may pivot about the driving member and includes two rollers having their longitudinal rotational axes parallel and spaced a fixed maximum distance apart, the driving member also having its longitudinal rotational axis parallel to the rotational axes of the rollers and arranged in a wedge-like relationship therebetween. The drive belt passes partially around a first of the rollers, between the first roller and the driving member and more than half-way around the circumference thereof, exiting between the driving member and a second of the rollers to pass partially therearound, such that as torque is applied to the driving member, the respective rollers will automatically exert radial forces against the belt in a direction normal to the driving member thereby effectively wedging the belt against the driving member for effecting driving engagement therebetween.

By this automatic belt tightener arrangement, as torque is applied to the driving member and if there is any slack in the belt, the roller assembly will pivot about the longitudinal rotational axis of the driving member in a direction corresponding to the direction of rotation of the driving member for allowing any slack in the belt to be taken up automatically by the passing of the belt further around the second roller to effect proper belt tensioning.

It is an object of the present invention to provide an automatic belt tightener capable of wedging the belt against the driving member for effecting driving engagement therebetween.

It is a further object to provide an automatic belt tightener capable of wedging the drive belt against the driving member in at least two places and as more torque is applied by the driving member, the belt will be wedged even more tightly against the driving member.

It is a further object to provide an automatic belt tightener which, in addition to effecting driving engagement between the belt and the driving member, is capable of automatically taking up any slack in the belt.

BRIEF DESCRIPTION OF THE DRAWINGS

FIG. 1 is a view, partially broken away, of one embodiment of the automatic belt tightener of the present invention shown in the short belt or slack belt position before tightening.

FIG. 2 is a perspective view of the automatic belt tightener partially disassembled shown in FIG. 1.

FIG. 3 is a view, partially broken away, of the embodiment of the automatic belt tightener of FIG. 1 shown with the belt in the tight or slack-taken-up position.

FIG. 4 is a view, partly in section and partly broken away, of an alternate embodiment of the automatic belt tightener of the present invention shown in conjunction with portions of a domestic clothes dryer.

DESCRIPTION OF THE PREFERRED EMBODIMENT

Referring generally to FIGS. 1 and 2, there is shown a belt drive mechanism for transmitting torque between a driving rotatable member such as a quill or shaft 10 operatively coupled through adapter 11 with a drive shaft 12 of a motor (not shown) and a rotatable member driven by the belt (also not shown) such as the rotating drum of a domestic clothes dryer.

In accordance with the present invention in one embodiment thereof an automatic belt tightener comprises a freely riding roller assembly denoted generally as 20 that is an assembly independent of and free to pivot about shaft 10. Included are two rotatable rollers such as first roller 22 and second roller 24, that have their longitudinal rotational axes parallel. Rollers 22 and 24 may be provided respectively with a pair of circumferential recesses or grooves disposed in parallel at opposing ends of the rotational axes of the respective rollers for receiving a pair of retaining rings 26. As an assembly then, rollers 22 and 24 have their respective longitudinal axes of rotation spaced apart by a fixed maximum distance denoted as A in FIG. 1. It should be noted that although distance A may not become greater, there are times when the rollers 22 and 24 might be slightly closer together.

Roller assembly 20 is arranged in a wedge-like relationship in that shaft 10 is positioned such that the longitudinal axis of rotation of the shaft 10 is parallel with the longitudinal axes of rotation of the rollers 22 and 24. The sides of rollers 22 and 24 rest against a shaft washer 28 that serves as one end of the restraining member for keeping assembly 20 in its proper place axially with respect to shaft 10.

A belt, such as an endless flat drive belt 30, serves to transmit torque between shaft 10 and a driven rotatable member, such as a clothes retaining drum of a domestic dryer. Portions of one of the retaining rings 26 are broken away to show more clearly the path of travel of drive belt 30. The direction of travel of drive belt 30 has been denoted in FIG. 1 by arrows with section 30a being under greater tension than section 30b when shaft 10 rotates in a counter-clockwise direction as shown in the drawings. Tracing the path then of drive belt 30, it proceeds around first roller 22, between the first roller 22 and shaft 10, passing more than half-way around the circumference of shaft 10, exiting between shaft 10 and second roller 24, passing partially therearound to proceed to the driven rotatable member or drum. As torque is applied to shaft 10, causing it to rotate in a counter-clockwise direction then, the tightening within the system will cause rollers 22 and 24 respectively to exert radial forces F against belt 30 normal to shaft 10 so as to effectively wedge the belt against the shaft to effect driving engagement therebetween. Furthermore, as belt 30 tightens and as greater torque is transmitted by shaft 10, the wedging effect of the belt against the shaft 10 will become even greater, thereby effecting even greater driving engagement therebetween. In other words, the greater the torque transmitted, the greater the ability to transmit torque.

In operation then, a second shaft washer 36 (shown in FIG. 2) is provided secured to shaft 10 by appropriate means, such as by a screw 37, for the retention of the roller assembly 20 in the appropriate arrangement with respect to shaft 10. Also, retaining rings 26, one ring on each side of the rollers, serve to guide belt 30 through its path of travel and prevent it from slipping from the rollers 22 and 24.

It can be seen then that rollers 22 and 24 ride on the belt 30 and shaft 10; the assembly 20 is an efficient transmitter of power because there is only rolling friction involved except for some unloaded side friction which is essentially negligible.

In a condition when belt 30 has excess length, as motor torque is applied to the shaft 10, portion 30a of the belt becomes taut and portion 30b becomes slack. This unbalance of forces causes the whole assembly 20 to pivot counter-clockwise about shaft 10 and take the position shown in FIG. 3. The geometry of the system is such that as the assembly 20 pivots, belt slack will be taken up by further wrapping of the belt around roller 24 which correspondingly causes the belt to transmit torque to the driven member.

FIGS. 1 and 3 represent the extreme operating positions of roller assembly 20 which may be assumed with the belt 30 arranged as shown.

The wedging effect of the shaft 10 between rollers 22 and 24 and the arrangement of the rollers with respect to the shaft serve to place belt 30 into what is essentially the ultimate surface contact and the best driving arrangement possible with shaft 10 under the circumstances. It should be noted, however, that effective wedging may still occur by placing rollers 22 and 24 further apart; that is by making distance A greater so that shaft 10 may be wedged further down between rollers 22 and 24. It should be noted, however, that for this wedging effect to occur, the belt 30 must contact shaft 10 at least slightly more than half-way around the circumference thereof.

An alternate embodiment of this invention is shown in FIG. 4 and may be utilized in accommodating a greater variety of belt lengths. Certain portions of the alternate embodiment are identical to those set forth in the embodiment shown in FIGS. 1–3 and are therefore referenced with the same numerals. This alternate embodiment is shown in conjunction with a domestic clothes dryer, only necessary portions of which are shown. Shaft 10 is operatively coupled with a motor 40 secured to the base portion of the dryer cabinet (not shown) for transmitting torque to effect driving engagement of a rotatable clothes-retaining drum 50. Rollers 22 and 24 are maintained in a spaced-apart relationship a fixed distance A by a pair of frame members 52 and have their rotational axes parallel to each other. Rollers 22 and 24 are mounted on bearings (not shown) suitably secured between these frame members so as to be freely rotatable about their longitudinal axis. The roller assembly 20 of this alternate embodiment cooperates with shaft 10 in essentially the same way as the embodiment shown in FIGS. 1–3. A pair of shaft washers, only one of which is shown and denoted 28, serves to keep the roller assembly properly axially located with respect to shaft 10.

A third roller 60 is provided, also suitably mounted between frame members 52, for taking up belt slack. Roller 60 is also bearing mounted so as to be freely rotatable and is provided with a pair of flanges 62 for keeping the belt 30 in place.

In operation, the roller assembly of this alternate embodiment is free to pivot with respect to shaft 10 as in the embodiment shown in FIGS. 1–3 such that any slack in belt 30 is taken up by its passing further around roller 60.

The distance or spacing between the longitudinal axes of rollers 24 and 60 respectively, and denoted as X in FIG. 4, may be changed and thereby accommodating a wide variety of belt-lengths.

Some dimensions of the automatic belt tightener components that have been found to provide satisfactory operation in the first embodiment for use with a shaft diameter of 5/16 inch are:

Roller 24 1.75 inches O.D., 0.329 inch groove depth
Roller 22 0.875 inch O.D., 0.165 inch groove depth
Retainer rings 26 2.375 inches I.D., 3.500 inches O.D. Washer 28 1.875 inches O.D.

Rollers 22, 24 and 60 may be made of any suitable material including plastic, and retaining rings 26 should, of course, have an outside diameter of sufficient dimensions to assure tracking of the belt on the driven member.

It should be mentioned that the present invention is not limited to use with a drive shaft of 5/16 inch diameter, but may be used equally as well with any such shaft diameter as is found practicable.

It should be apparent to those skilled in the art that the embodiments described heretofore are considered to be the presently preferred forms of this invention. In accordance with the Patent Statutes, changes may be made in the disclosed apparatus in the manner in which it is used without actually departing from the true spirit and scope of this invention.

What is claimed is:

1. In a belt drive mechanism for transmitting torque between a driving rotatable member and a driven rotatable member through a drive belt, an automatic belt tightener comprising:

a freely riding, roller assembly pivotable about the driving member and including two rollers having their longitudinal axes of rotation parallel and spaced a fixed maximum distance apart, the driving member having its longitudinal axis of rotation parallel to the rotational axes of the rollers and arranged in a wedge-like relationship therebetween; and the drive belt passing partially around a first of the rollers, between the first roller and the driving member and more than half-way around the circumference thereof, exiting between the driving member and a second of the rollers to pass partially therearound, such that as torque is applied to the driving member the respective rollers will automatically exert radial forces against the belt normal to the driving member effectively wedging the belt against the driving member for effecting driving engagement therebetween.

2. The automatic belt tightener of claim 1 wherein, as torque is applied to the driving member, the roller assembly may pivot with respect to the longitudinal rotational axis of the driving member in a direction corresponding to the direction of rotation of the driving member for taking up automatically any slack by the passing of the belt further around the second roller to effect proper belt tensioning.

3. The automatic belt tightener of claim 1 wherein a third roller, having its longitudinal rotational axis parallel with that of the second roller, is arranged such that as torque is applied to the driving member, the roller assembly will pivot with respect to the longitudinal rotational axis of the driving member in a direction corresponding to the direction of rotation of the driving member for taking up automatically any slack by the passing of the belt partially around the third roller to effect proper belt tensioning.

4. The automatic belt tightener of claim 3 wherein the distance between the longitudinal rotational axis of the second and third rollers is adjustable.

5. The automatic belt tightener of claim 1 wherein the rollers are rotatably maintained in a spaced-apart relationship a fixed distance by a pair of retaining rings, the rollers being provided respectively with a pair of circumferential recesses disposed in parallel at opposing ends of the longitudinal rotational axis thereof for receiving the retaining rings.

6. The automatic belt tightener of claim 1 wherein the rollers are maintained in a spaced-apart relationship a fixed distance by a pair of frame members, the respective rollers being rotatably secured therebetween.

7. In a domestic clothes dryer having a belt drive mechanism for transmitting torque between a driving rotatable member and a rotatable clothes retaining drum through an endless drive belt, an automatic belt tightener comprising:

a freely-riding, roller assembly pivotable about the driving member and including at least two rollers having their longitudinal axes of rotation parallel and spaced apart a fixed maximum distance, the driving member having its longitudinal axis of rotation parallel to the rotational axes of the rollers and arranged in a wedgelike relationship therebetween; and the endless drive belt passing partially around a first of the rollers, between the first roller and the driving member and more than half-way around the circumference thereof, exiting between the driving member and a second of the rollers to pass partially there-around, such that as torque is applied to the driving member, the respective rollers will automatically exert radial forces against the belt normal to the driving member effectively wedging the belt against the driving member for effecting driving engagement therebetween.

8. The automatic belt tightener of claim 7 wherein, as torque is applied to the driving member, the roller assembly may pivot with respect to the longitudinal rotational axis of the driving member in a direction corresponding to the direction of rotation of the driving member for taking up automatically any slack by the passing of the belt further around the second roller to effect proper belt tensioning.

9. The automatic belt tightener of claim 7 wherein a third roller, having its longitudinal rotational axis parallel with that of the second roller, is arranged such that as torque is applied to the driving member, the roller assembly will pivot with respect to the longitudinal rotational axis of the driving member in a direction corresponding to the direction of rotation of the driving member for taking up automatically any slack by the passing of the belt partially around the third roller to effect proper belt tensioning.

* * * * *